(12) United States Patent
Leiber et al.

(10) Patent No.: US 10,501,070 B2
(45) Date of Patent: Dec. 10, 2019

(54) HIGH-POWER, LOW-VOLTAGE GENERATOR WITH STARTER-SUPPORT FUNCTION AND TORQUE COMPENSATION

(71) Applicant: LSP Innovative Automotive Systems GmbH, Unterföhring (DE)

(72) Inventors: Thomas Leiber, Munich (DE); Christian Köglsperger, Geretsried (DE); Franz Schöglmann, Munich (DE)

(73) Assignee: LSP Innovative Automative Systems GmbH, Unterföhring (DE)

( * ) Notice: Subject to any disclaimer, the term of this patent is extended or adjusted under 35 U.S.C. 154(b) by 38 days.

(21) Appl. No.: 15/726,844

(22) Filed: Oct. 6, 2017

(65) Prior Publication Data
US 2018/0099657 A1    Apr. 12, 2018

(30) Foreign Application Priority Data

Oct. 6, 2016   (DE) .................. 10 2016 118 969
Oct. 18, 2016  (DE) .................. 10 2016 119 822

(51) Int. Cl.
| | | |
|---|---|---|
| *B60W 20/17* | (2016.01) | |
| *B60K 6/24* | (2007.10) | |
| *B60W 10/08* | (2006.01) | |
| *F02N 11/12* | (2006.01) | |
| *H02P 9/12* | (2006.01) | |
| *H02K 9/19* | (2006.01) | |
| *F02N 11/04* | (2006.01) | |
| *H02P 9/30* | (2006.01) | |
| *H02M 1/00* | (2006.01) | |

(Continued)

(52) U.S. Cl.
CPC ............... *B60W 20/17* (2016.01); *B60K 6/24* (2013.01); *B60W 10/08* (2013.01); *F02N 11/006* (2013.01); *F02N 11/04* (2013.01); *F02N 11/087* (2013.01); *F02N 11/12* (2013.01); *H02K 1/00* (2013.01); *H02K 1/187* (2013.01); *H02K 3/522* (2013.01); *H02K 7/006* (2013.01); *H02K 9/19* (2013.01); *H02K 9/22* (2013.01); *H02M 1/00* (2013.01); *H02M 7/797* (2013.01); *H02P 9/30* (2013.01); *H02P 9/48* (2013.01); *B60L 2210/30* (2013.01); *F02N 11/00* (2013.01); *F02N 15/023* (2013.01); *F02N 2011/0896* (2013.01); *H02P 2101/25* (2015.01)

(58) Field of Classification Search
None
See application file for complete search history.

(56) References Cited

U.S. PATENT DOCUMENTS 6,202,776 B1 *  3/2001  Masberg ............. F02B 67/04
                                              180/65.22
6,487,998 B1 * 12/2002  Masberg ............. B60L 7/003
                                              123/192.1

(Continued)

*Primary Examiner* — Colby M Hansen
(74) *Attorney, Agent, or Firm* — Panitch Schwarze Belisario & Nadel LLP

(57) ABSTRACT

A vehicle, e.g., an off-road vehicle, may include an internal combustion engine, a starter motor coupled to the engine via a multi-stage transmission during a starting process, a further electric machine coupled to a crankshaft of the engine, and a converter arranged to supply at least one energy storage unit, e.g., a battery. The converter may be configured as a 4-quadrant regulator having a B6 circuit of MOSFETs.

13 Claims, 9 Drawing Sheets

(51) Int. Cl.

|          |           |
|----------|-----------|
| *H02K 1/00*  | (2006.01) |
| *H02P 9/48*  | (2006.01) |
| *H02K 1/18*  | (2006.01) |
| *H02K 3/52*  | (2006.01) |
| *H02K 7/00*  | (2006.01) |
| *H02K 9/22*  | (2006.01) |
| *H02M 7/797* | (2006.01) |
| *F02N 11/00* | (2006.01) |
| *F02N 11/08* | (2006.01) |
| *H02P 101/25*| (2016.01) |
| *F02N 15/02* | (2006.01) |

(56) References Cited

U.S. PATENT DOCUMENTS

| | | | |
|---|---|---|---|
| 9,154,051 B2* | 10/2015 | Raichle | B60L 3/04 |
| 2001/0052760 A1* | 12/2001 | Amano | B60K 6/485 |
| | | | 320/163 |
| 2016/0052505 A1* | 2/2016 | Zhou | B60L 7/14 |
| | | | 701/22 |

* cited by examiner

HIGH-POWER, LOW-VOLTAGE GENERATOR WITH STARTER-SUPPORT FUNCTION AND TORQUE COMPENSATION

CROSS-REFERENCE TO RELATED APPLICATION

This application claims priority to German Application Number 102016118969.3, filed Oct. 6, 2016, and German Application Number 102016119822.6, filed Oct. 18, 2016, the disclosure of which are incorporated herein by reference.

PRIOR ART

In off-road vehicles (ATV, UTV, etc.) a starter is used which, via a multi-stage gear unit drives the crankshaft of a combustion engine in order to start the combustion engine. Following a successful starting process, this is decoupled from the combustion engine, e.g. by an overrunning clutch or engagement mechanism. A generator is provided separately, which is driven via the crankshaft of the combustion engine and supplies the vehicle electrical system and the battery with power. The crankshaft, the gear unit of the starter and the generator are arranged in a housing operating in the oil or oil mist.

Such a generator is operated with a thyristor circuit, e.g. from Trombetta, as a rule as described in U.S. Pat. No. 8,681,521 (FIG. 2a). Alternatively, an electronic circuit is used as employed by the off-road vehicle manufacturer Textron (FIG. 2b).

Such circuits lead to high efficiency losses, in particular in the generator, thereby limiting the power output.

Due to the increasing number of electrical consumers, such as sound systems, satnavs, multimedia devices, and installed electrical components such as, for example, cable winches, increasingly-more electrical power is needed. To increase power, in the prior art either further generators are installed, such as for example alternators from the automotive area, driven by the crankshaft or the parts moved by the combustion engine. Alternatively, separate generators are used for the power requirement, driven by a simple single-cylinder engine.

Given the increasing numbers of electrical consumers in off-road vehicles also, a more inexpensive approach to increasing the power is called for.

OBJECT OF THE INVENTION

The object of the invention is to increase the electrical power available in the vehicle and to reduce the costs and weight of the starter/generator system.

Achievement of the Object

The increase in power is achieved in that instead of the thyristor circuit, a B6 inverter with MOSFETs is used, as a result of which the electric machine previ-ously used solely as a generator can be used as a motor to support the starting process and in addition advantageously during generator operation can make additional power available. As a result of this novel starter/generator concept the electrical power available can be significantly increased. By using the starter/generator in 4-quadrant mode, firstly the starter motor itself can have a smaller configuration and secondly due to the better power yield of the B6 inverter, the generator can similarly have smaller dimensions where additional electrical power is not needed.

The thyristor invertors currently used in serial production, as shown in FIG. 2a and FIG. 2b, have disadvantages compared to the B6 bridge rectifier principle as shown, by way of example, in FIG. 2c.

The main disadvantage of the thyristor circuit is that when the thyristors are active, the motor can only be operated at one operating point. This is a disadvantage particularly at low speeds. The motor/generator design is also highly restricted, since all operating points of the generator must be above the idling speed of the generator for the thyristor circuit to be activated in the first place. The active bridge rectifier of the invention can both raise and lower. Therefore, even at low speeds it is able to provide power to the vehicle electrical system. Ultimately these restrictions lead to a higher output power of the overall system of the invention.

A further disadvantage of the thyristor circuit or of the diode rectifier according to the prior art is that the phase currents have a high harmonics content. These cause high losses in the laminated core but also in the magnets. If the motor/generator is properly designed, the active bridge rectifier, which regu-lates the currents with PWM control, generates a sine wave without harmful harmonics. In addition, the diode voltage always drops away at the diodes and thyristors. This is not the case with MOSFETs. While the latter have a contact resistance when the MOSFETs are switched (Rdson) and switching losses, these are generally very low.

The vehicle concept of the invention, with the concept presented, allows the generator to be designed such that with the same installation space a higher output voltage is available.

Furthermore, the B6 bridge circuit allows 4-quadrant operation, i.e. operation both at positive and negative speeds and positive and negative torques, whereas the thyristor circuit allows just a 2-quadrant operation in the generator operating mode (negative speed and positive torque, positive speed and negative torque, see FIGS. 2a and 2b). These possibilities can be used according to the invention in order that during the starting process the starter is supported by the starter/generator, as described in FIG. 6. This degree of freedom allows downsizing of the starter and the starter gear unit, since for the starter process the starter requires a lower power and a lower torque. This can be used to reduce the cost of the starter motor and the starter gear unit. In addition, a less expensive or smaller battery can be used since the efficiency of the starter process is improved by the higher efficiency of the start-er/generator. This improvement is due to the fact that the generator has a higher efficiency than a starter since, for example, it uses rare earth magnets and is built as an external rotor motor with the physical advantage of a higher level of efficiency and the transmission losses are less of a burden on the overall efficiency. These advantages advantageously lead to a reduction in battery size or the use of a less expensive battery.

The degrees of freedom of the field-oriented motor control of a of a B6 bridge circuit with MOSFETs also allow very rapid torque compensation of the combustion engine, as represented and described in FIG. 7. This is highly advantageous, in particular with simple 2-cylinder or 3-cylinder motors, since in these the torque fluctuations of the combustion engine are very high. This compensation reduces wear of the bearings and improves the quietness of the combustion engine. In idling mode in particular or with the vehicle at a stand-still, when even very soft noises can be annoying, the compensation can be set very effectively and leads to greater quietness.

A further increase in power is also achieved according to the invention through structural design. So, firstly the exciter coils of the generator can be cast with the housing or an intermediate section secured to the housing. The intermediate section can advantageously be designed such that the exciter coils have only a very small distance to the intermediate section. In this way, heat transfer from the exciter coils, which are the primary generators of heat, is significantly improved compare with air or oil mist cooling. Since even just a thermoplastic has a specific conductance, greater than that of air by a factor of 10 (0.3 W/mK instead of 0.026 W/mK), a good heat transfer to the housing can be achieved, if between the exciter coils and the intermediate section a small clearance, as far as possible of less than 1 mm, is provided, and the stator is introduced with the intermediate section as a component assembly in the fill flow in the injection moulding process.

The heat transfer can be further improved by selecting a filler material with a high specific conductance and which, for example, contains fillers such as boron nitride. The thermal conductance can be increased with these fillers to 4 W/mK. Up to a thermal conductance of 1 W/mK as a rule a vacuum casting method is used, and with filler materials containing boron nitride as a rule a thermosetting plastic manufacturing method is required.

A further improvement in the heat dissipation can be achieved according to the invention in that the intermediate section is designed such that the largest possible material cross section between stator and housing is formed below the exciter coils. As a result of the large cross-section, the heat output from the stator to the housing can be significantly improved.

A further improvement can be achieved in that the stator is not fully cast with the exciter coils, but on the side turned away from the housing or the side turned towards the rotor is open or not covered with casting compound, so that the oil mist present comes into direct contact with the exciter coils and is able to wet these. Since the exciter coils have the highest temperatures on their side turned away from the housing, this measure is highly effective and also reduces the drop in temperature between the other side of the exciter coils and the housing. The reduction in the drop in temperature reduces the stresses in the cast material and thus increases the durability of the casting compound. The motor/generator can also be operated at a higher temperature.

A further improvement in power can also be achieved in that the rotor is laminated and so the iron losses are reduced. With existing serially-produced ro-tors subsequent processing is possible wherein then a recess is created in the rotor, in which a stamped laminated core is inserted.

Apart from the B6 inverter circuit, through improved heat transfer and a reduction in the losses in the motor the output can further be increased. This can advantageously also be used in such a way that the dimensions are re-tained and existing serially-produced parts can to the greatest-possible extent be used or slightly modified. The validation and tooling for new mechanical components is therefore less involved, allowing faster and more economical implementation.

It is logical to fit the motor shaft with a sensor, in order that a high angular resolution can be used. This has significant advantages, in particular for sup-porting the starting process and the torque compensation, since an alternative regulation without a sensor will be restricted in terms of accuracy and the operating speed range.

The low additional costs of using a B6 bridge are offset by cost savings from the starter and starter gear unit and from the battery, meaning that through the invention, with little or no additional cost a significant power control and at the same time quietness can be achieved.

DESCRIPTION OF FIGURES

In the following the vehicle concept of the invention is explained in more detail using drawings.

These show as follows:

FIG. 1 shows a possible structure of the starter-generator system of the invention for a vehicle. The system consists of a combustion engine (ICE=Internal Combustion Engine) 1, connectable via a gear unit 3 with a starter motor 2. The gear unit between the starter motor and the combustion engine generally has a multi-stage design, so that a smaller starter motor can be used. The gear unit also has an overrunning clutch (X) or uncoupling mechanism (e.g. a Bendix engagement mechanism), which ensures that following a successful start of the combustion engine the starter is not driven. Apart from the starter switch 15, the control unit 11 also controls, inter alia, the converter 7. It is logical for the current of the starter motor to be cap-tured, in order to support the inverter during the starting process by synchro-nised control of the phase currents of the motor E. The crankshaft 4 of the combustion engine 1 is connected to the rotor 5 of the electric machine E, so that optionally the combustion engine 1 drives the rotor 5 and thus induces a voltage within the exciter coils 6a arranged in the inner stator 6. The electric machine E therefore works as a generator, and the electrical power it generates is then rectified via the converter 7 and fed into the vehicle electrical system 12 and inter alia the battery 13 is charged. Conversely, the control unit 11 can drive the MOSFETs of the converter 7 so that via the exciter coils 6a a driving, rotating magnetic field develops which drives the rotor 5 with its permanent magnets 9, such that the electric machine E works as a motor and to support the starter motor 2 during the starting process drives the shaft 4 and thus the combustion engine 1.

Figure 1:
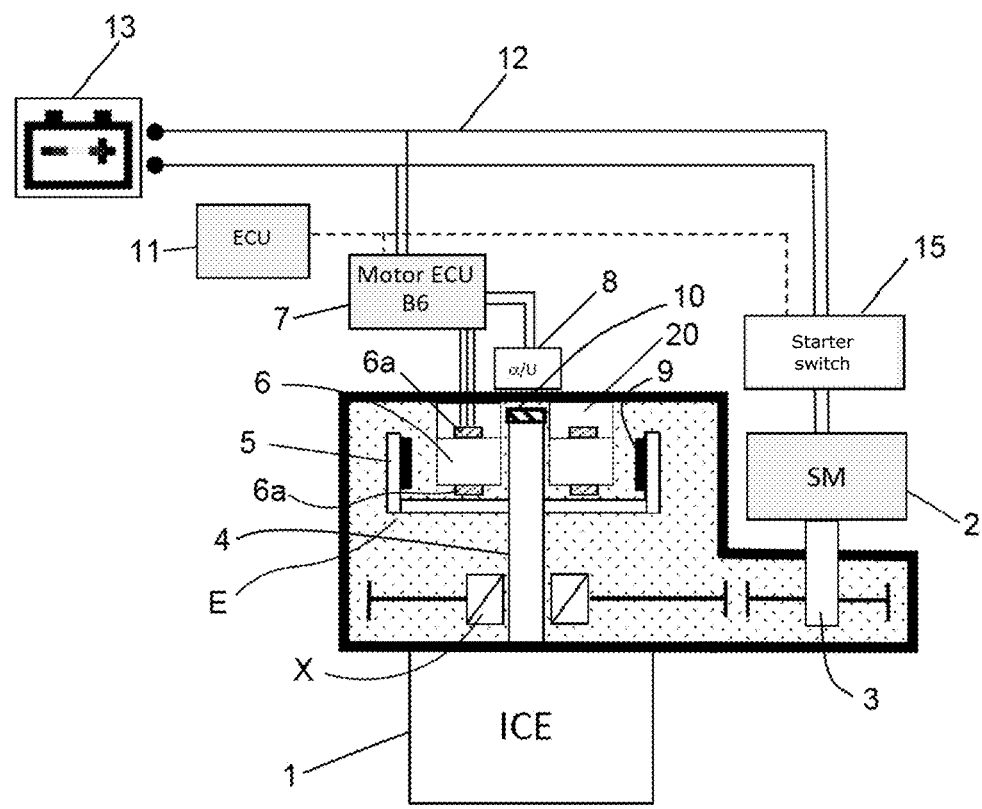
FIG. 1: The structure of the starter-generator system.

On the shaft 4 a target 10 is arranged, the movement of which is detected by a sensor unit 8, whereby the activation of the B6 circuit can be performed with accuracy. Between the inner stator 6 and the housing an intermediate section 20 functioning as a heat conductor is arranged.

Figure 2A:
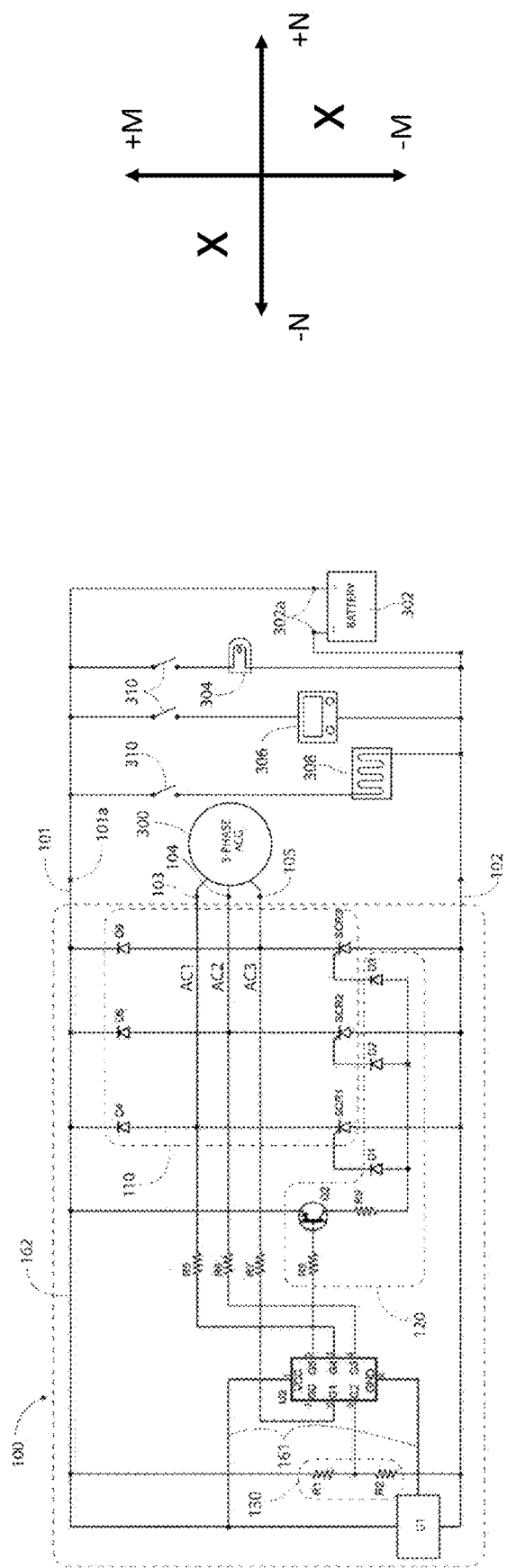
FIG. 2a: Thyristor-converter circuit of the prior art.

FIG. 2a shows a conventional converter with thyristors, which can be operated merely in 2-quadrant mode. The same applies for the electronic circuit of FIG. 2b.

Figure 2B:
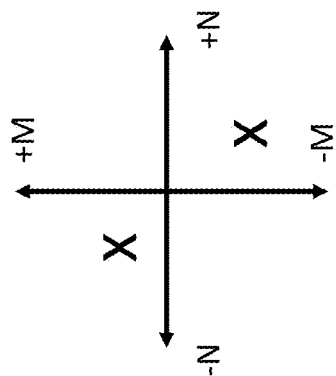
FIG. 2b: Alternative thyristor-converter circuit of the prior art.
Figure 2B:
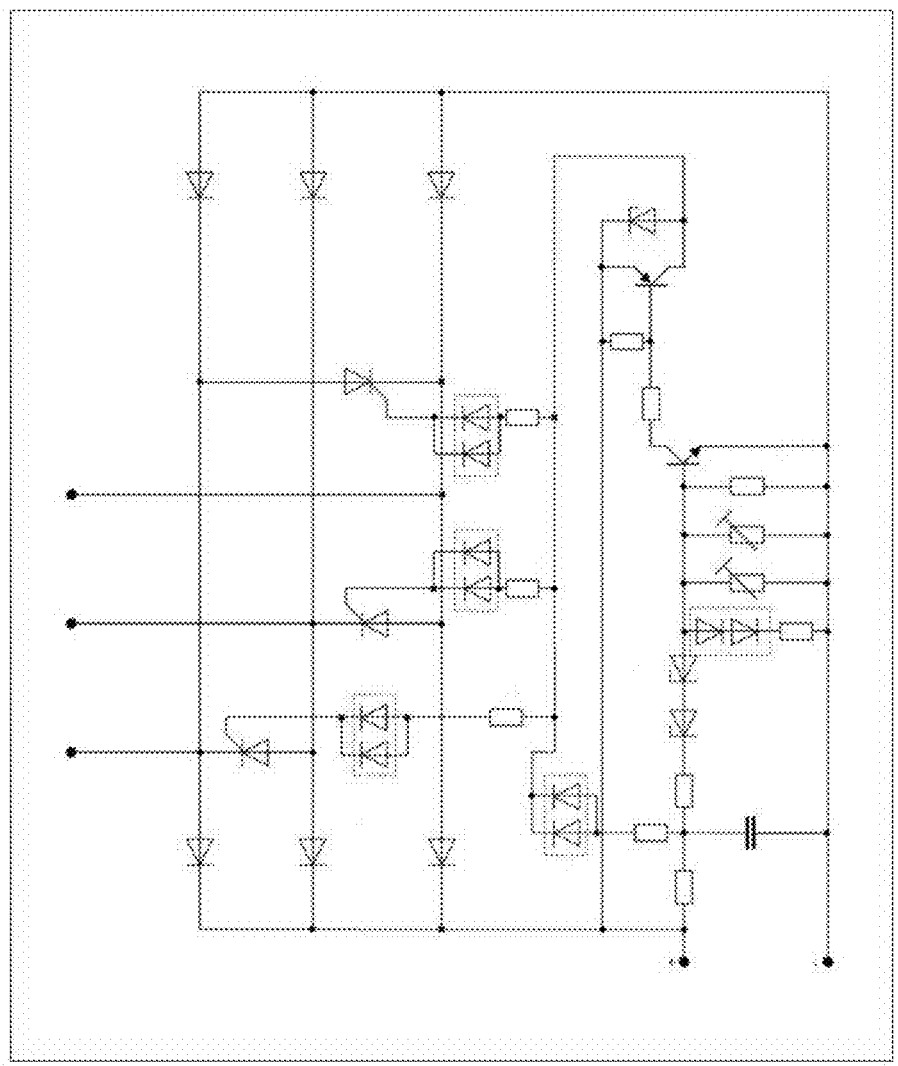
Figure 2C:
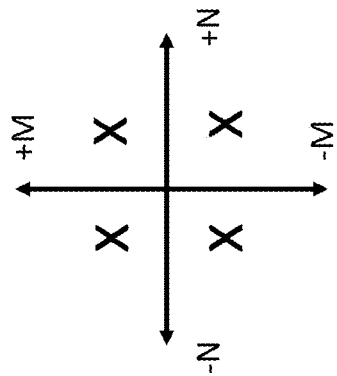
FIG. 2c: B6 converter circuit of the invention with MOSFETs.
Figure 2C:
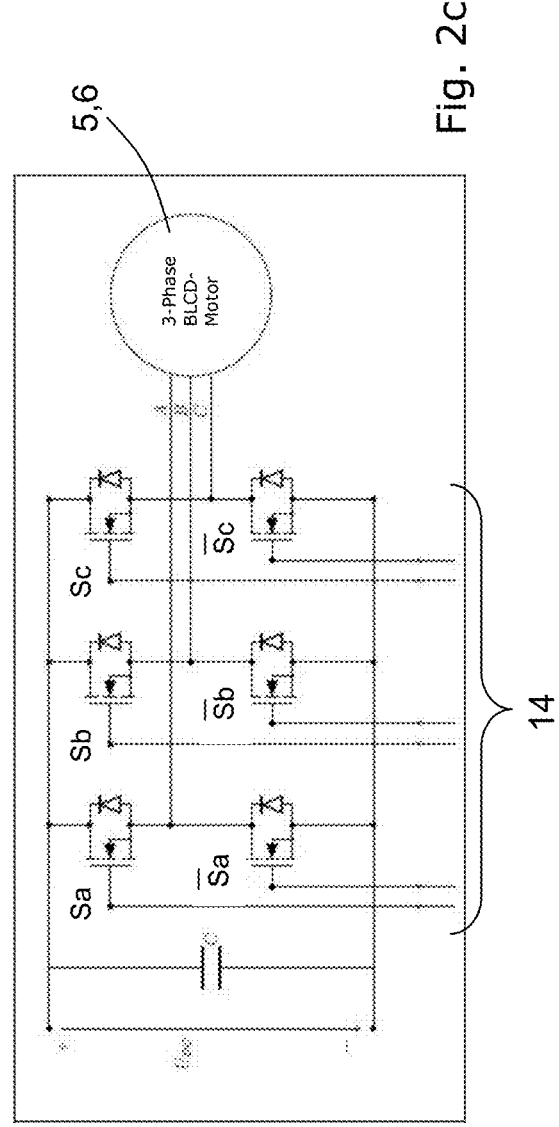

FIG. 2c shows the B6 circuit 14 of the invention consisting of six MOSFETs, which can be operated in 4-quadrant mode.

Figure 3:
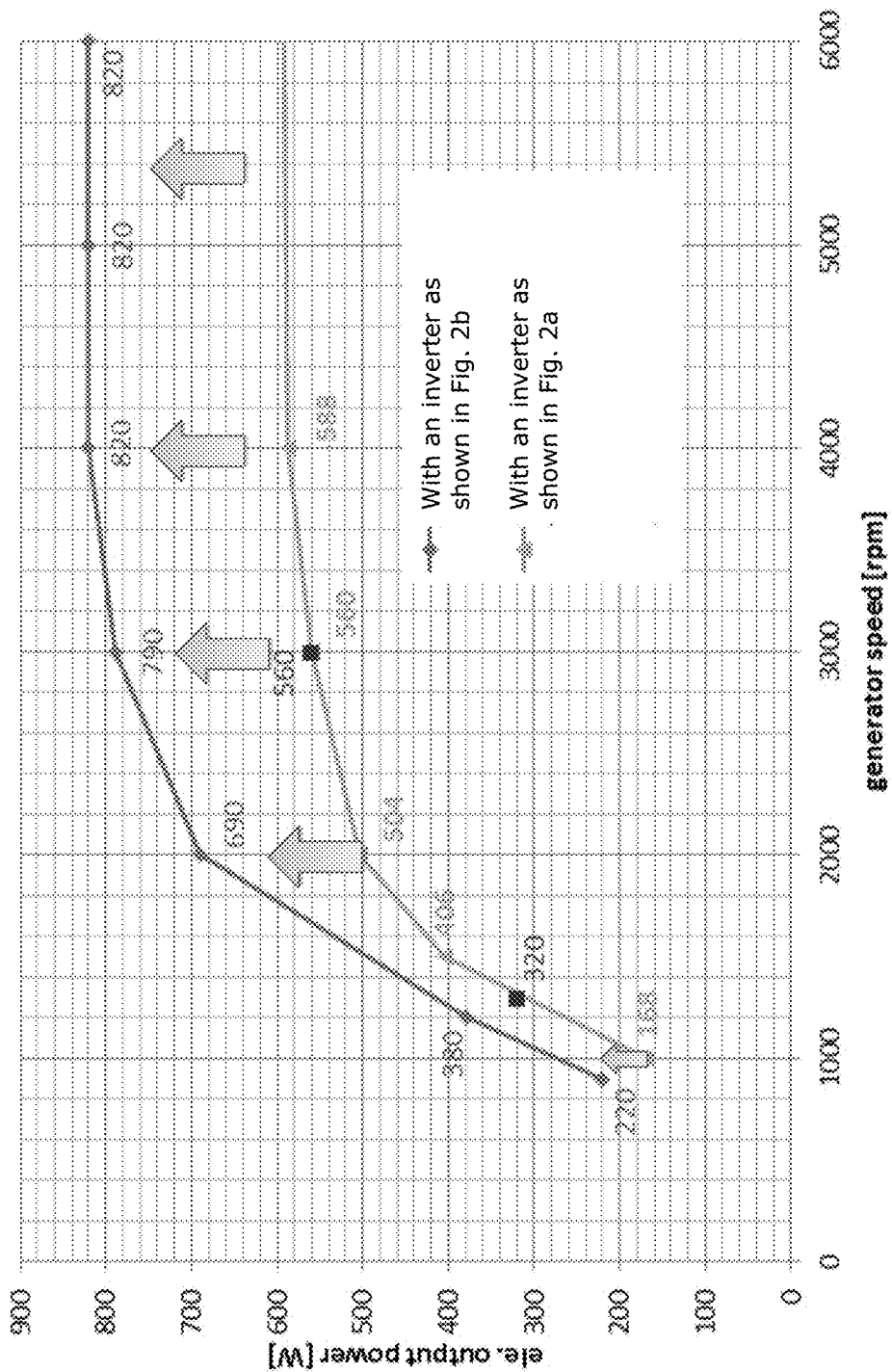
FIG. 3: Diagram illustrating the increase in power due to the measures of the invention.

FIG. 3 shows a diagram to illustrate the increase in power as a result of using a converter, as illustrated and described in FIG. 2b. The bottom curve shows the output power with a rectifier shown in FIG. 2a. With the same generator, but using the rectifier illustrated in FIG. 2b with B6 MOSFET cir-cult, the output power increases (top curve), as a result of which a significantly better level of efficiency is achieved.

Figure 4:
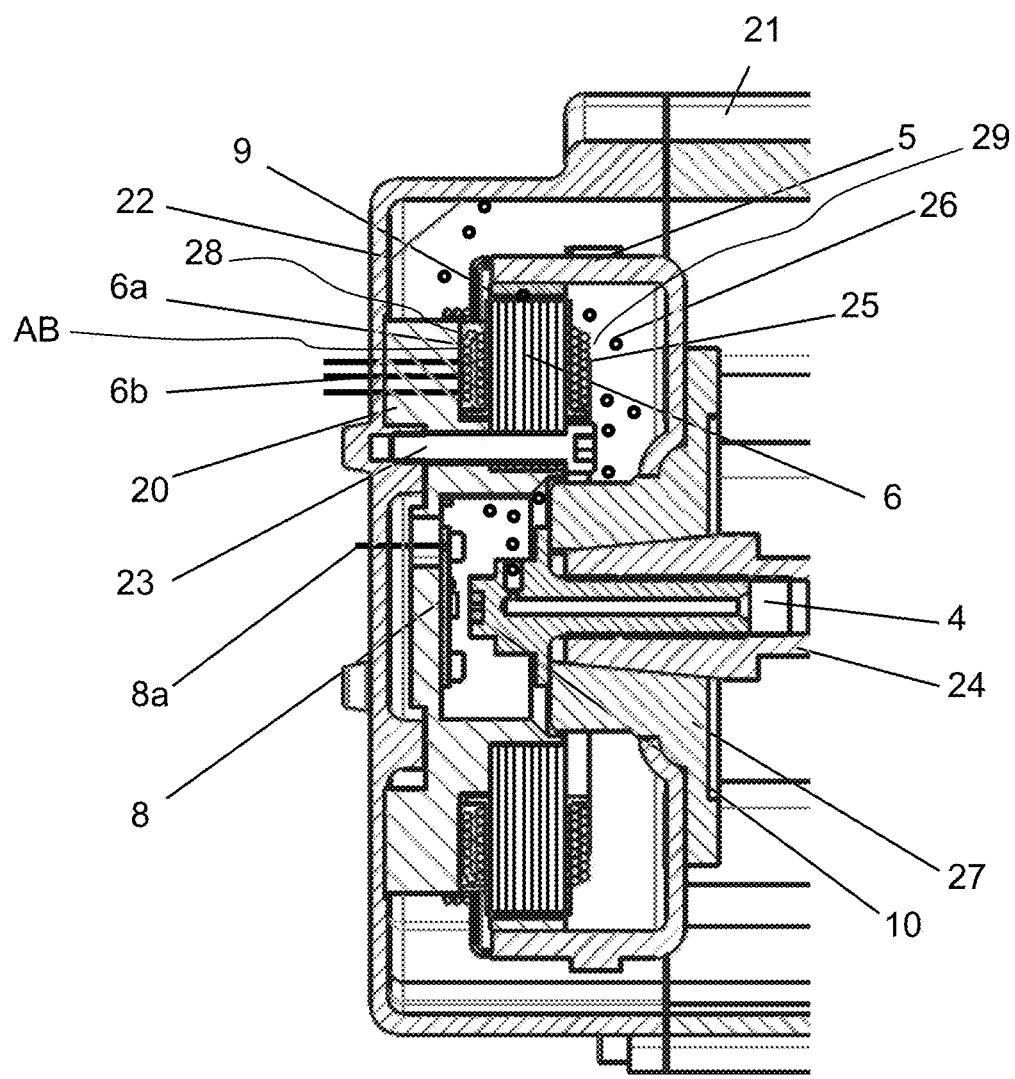
FIG. 4: Possible structure of a generator of the invention.

FIG. 4 shows a possible structure of an electric machine E of the invention, which can be operated as a generator or motor. The electric machine E has a housing 21, which with its inner wall 22 delimits an interior space, in which the inner stator 6 with the exciter coils 6a arranged on it and the external rotor motor 5 are arranged. The rotor 5 supports on its cylindrical inner wall permanent magnets 9 and is secured against rotation via its bottom wall with the shaft via connecting elements 24, 27. On the shaft end a target 10 is secured, the rotation of which is detected by the sensor 8. The connecting lines 8a of the sensor 8 are axial fed axially out of the housing 21.

The inner stator 6 is connected via an intermediate section 20 by means of screws 23 with the housing 21. The intermediate section and the inner stator 6 with its exciter coils 6a are enclosed completely or in sections by casting compound 25. Advantageously, on the side 29 turned towards the rotor 5, the casting compound 25 does not fully enclose the stator 6 or its exciter coils 6a, so that the oil mist 26 present in the interior space of the housing comes into direct contact with the inner stator 6 and/or the exciter coils 6a, so that via the oil mist 26 the heat is rapidly dissipated from the stator 6 and the exciter coils 6a to the housing. The exciter coils 6a are located with a very small clearance AB from the intermediate section 20, so that good heat dissipation via the intermediate section 20 to the housing 21 occurs.

Figure 5:
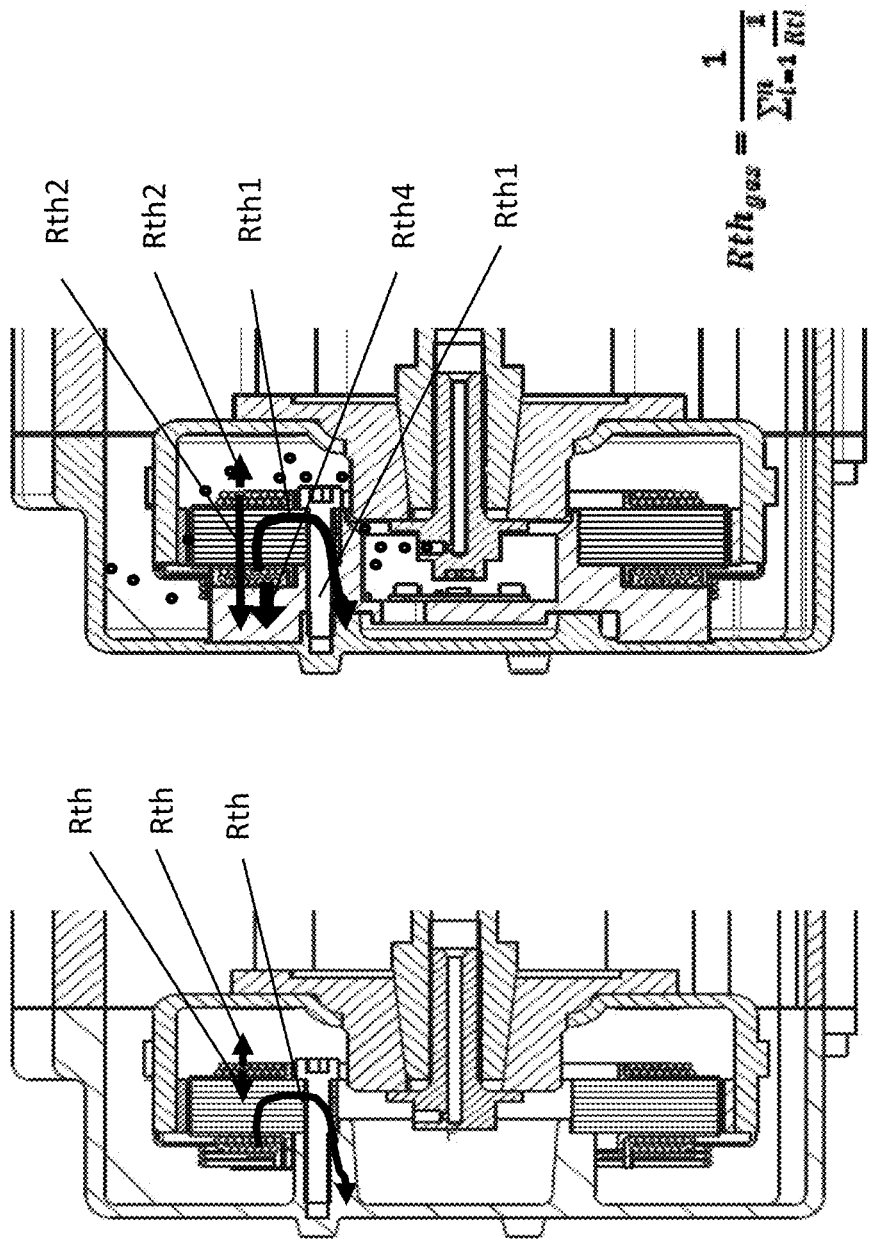
FIG. 5. Measures to improve the thermal process and to increase power.

The left side of FIG. 5 shows a conventional electric machine, often used as a generator, where the inner stator with the exciter coils is secured to a cylindrical projection in the inside of the housing. With this type of construction, the heat from the inner stator and its exciter coils can primarily drain away via the path designated Rth1 or heat transfer resistances, since the remainder of the stator is in contact with the air and in the heat conduction effect, due to the very low specific conductance of the air (0.026 W/mK), can be ignored. The heat transfer between exciter coils and stator can be quite unfavourable if the coils have not been drizzled with oil or the coils are in contact with one another and with the stator insulation. This can only be achieved through a highly precise coiling technique. The heat transfer resistances Rth1 are conse-quently relatively high, so that the power of the electric machine is limited due to the heating that occurs and the poor heat dissipation.

The right side shows the electric machine of FIG. 4. The various effectively operating heat transfer resistances $R_{th1}$-$R_{th4}$ of the electric machine of the invention are designated by $R_{thi}$.

$R_{th1}$: Thermal resistance coil→inner stator→housing $R_{th2}$: Thermal resistance coil head SK1→housing via casting compound $R_{th3}$: Thermal resistance coil head SK2→housing via copper line and casting compound $R_{th4}$: Thermal resistance coil head SK2→oil mist The total thermal resistance $Rth_{ges}$ is given by the following formula (compara-ble to the connection in parallel of electric resistances):

$$Rth_{ges} = \frac{1}{\sum_{i=1}^{n} \frac{1}{Rth_i}}$$

Compared the prior art, $R_{th1}$ has been reduced in such a way that the cross-sectional area between the stator and housing through advantageous design of an intermediate section is increased and the path to the housing is as short as possible.

Due to the close fit or short distance AB between the intermediate section 20 and the exciter coils 6a, the thermal resistance $R_{th2}$ is relatively small, so that the heat is properly dissipated from the exciter coils of the exciter coil head SK1 directly to the housing.

$R_{th3}$ represents the thermal resistance of the exciter coil head SK2, the rotor of which is turned towards the intermediate section 20, which is thereby improved, since copper is an extremely good heat conductor and the heat of the coils can be dissipated both via the casting and via the stator.

$R_{th4}$ represents a further effective heat path, since the coil head SP2 is in open contact with an oil mist, in that the coil head SP2 is not completely cast. Since it is at the coil head SP2 that the highest temperatures usually arise, the heat conduction can be effectively used to reduce the drop in temperature in the stator and stresses in the casting.

Even if the resistance $R_{th2}$ through the use of a filler material with good thermal conductance properties as a result, inter alia, of minimum distances of the exciter coils (approximately 1 mm) to the intermediate section is higher than the primarily effective thermal resistance $R_{th1}$ (greater by a factor of 3-5), through this measure the thermal resistance can be reduced by 20%-30%, since the higher resistance is effective in the parallel connection of the resistances. Since apart from the thermal resistance, account has to be taken of the fact that the resistance of copper increases as it heats up and the power loss increases further, due to the lower thermal resistance at a given housing temperature the dissipated power loss, limited by the maximum temperature of the coils, can be increased by more than 50%. The further resistances $R_{th3}$ and $R_{th4}$ continue to have a favourable effect on the power of the electric machine.

Figure 6:
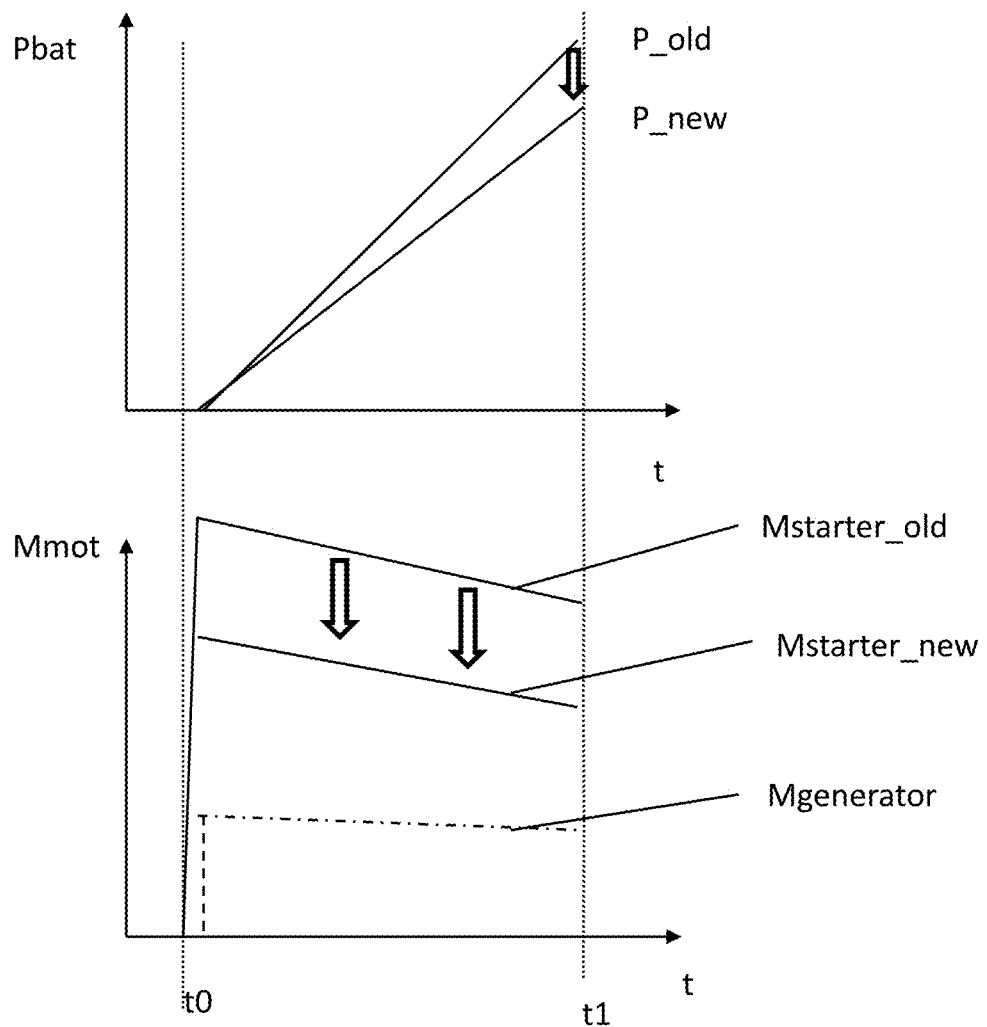
FIG. 6: Starter process with starter and starter/generator.

FIG. 6 shows the starter process with starter and starter/generator. The lower diagram shows for the torque Mstarter_old of the starter motor to be applied for the starting process. In a conventional concept with a single, large starter motor, not supported by the generator, this must be designed so that it can provide the necessary motor torque Mstarter_old on its own.

With the concept of the invention, the starter motor merely has to apply the torque Mstarter_new. The electric machine operated during motor operation provides the remaining motor torque Mgenerator.

The top diagram shows the power required for the starter process, wherein the curve P_old shows the necessary power for a single, unsupported starter motor and rectifier with thyristor circuit. The curve P_new shows the electrical power needed for the concept of the invention, wherein the saving is achieved by the B6 MOSFET circuit of the converter and the structural features of the electric machine.

Figure 7:
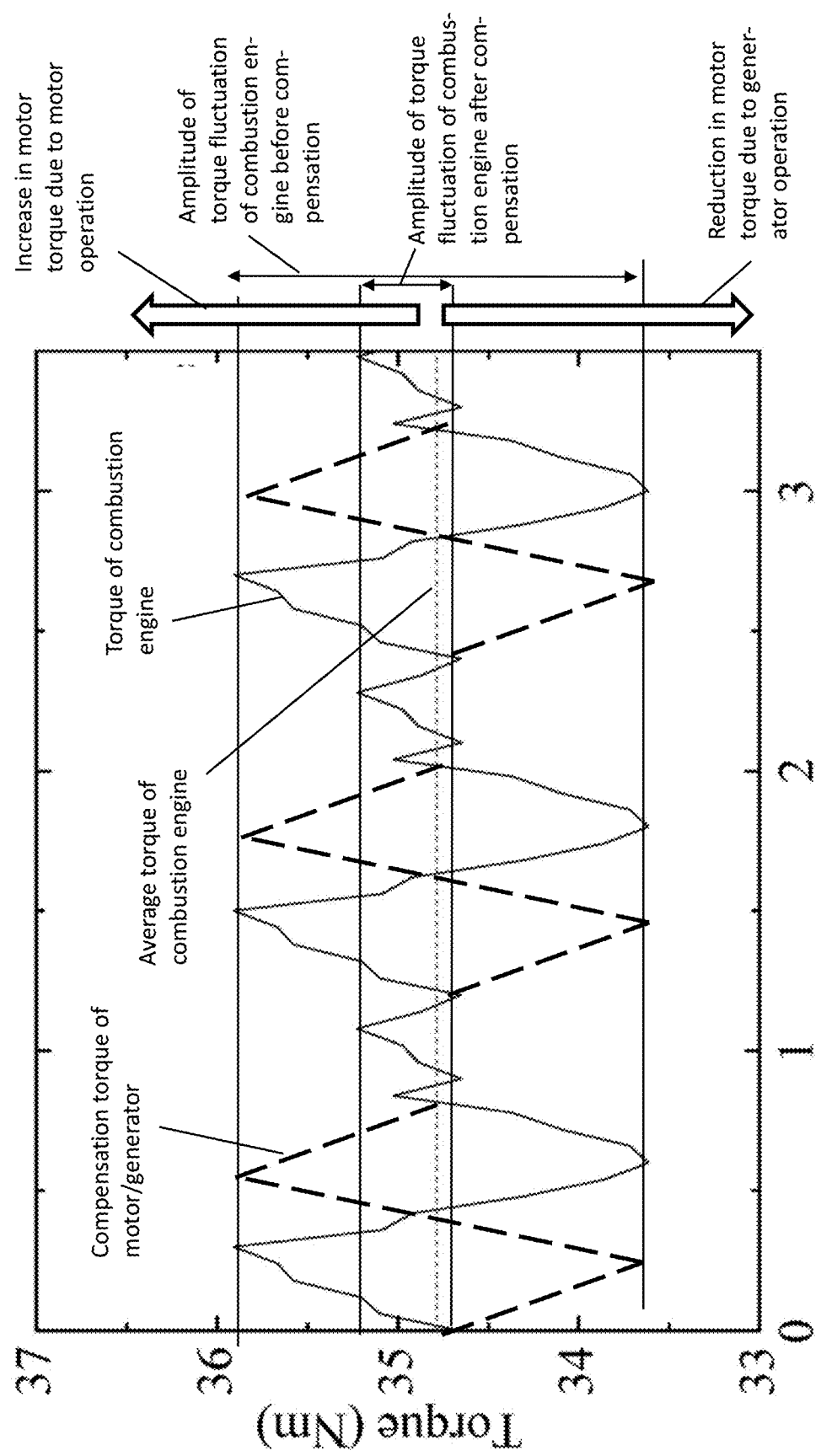
FIG. 7: Torque-ripple compensation method.

FIG. 7 shows a possible torque-ripple compensation method, in which the electric machine simultaneously generates a torque through corresponding activation of the rectifier, but simultaneously also electrical energy via the rotor driven by the combustion engine. Through the corresponding activation of the B6 MOSFET circuit, the compensation torque (dashed line) is generated, which is added to the torque of the combustion engine (solid line) to give a drive torque, the amplitude of which is significantly smaller than the torque fluctuations, which result solely from the combustion engine.

What is claimed is:

1. A vehicle, including:
a combustion engine with less than six cylinders,
a starter motor configured to drive the combustion engine,
a multi-stage transmission, wherein the starter motor is configured to drive the combustion engine during a starting process, and
wherein, following the starting process, the starter motor is decoupled from the combustion engine via an uncoupling mechanism,
an electric machine, distinct from the starter motor, configured to be operated as a motor and generator, having a fixed connection to a crankshaft of the combustion engine and by which the combustion engine is able to be driven, and
a converter, having an electrical connection with windings of the electric machine, and which is configured to convert an alternating current generated by the electric machine to a direct current,
wherein the converter is configured to supply at least one energy store in the form of a battery, and
wherein the converter comprises a 4-quadrant regulator comprising a B6 bridge circuit of metal-oxide-semiconductor field-effect transistors (MOSFETs).

2. The vehicle according to claim 1, further including a control unit configured to drive the 4-quadrant regulator of the converter in such a way that the electric machine, during motor operation, works to support the starter motor.

3. The vehicle according to claim 2, wherein the control unit is configured to drive the 4-quadrant regulator of the converter in such a way that electrical compensation currents flow into the electric machine driven by the combustion engine, which compensation currents bring about compensation torques to suppress torque fluctuations of the combustion engine and thus improve the quietness and noise performance of the combustion engine.

4. The vehicle according to claim 1, wherein the electric machine is an external rotor motor, wherein the rotor is fitted with permanent magnets.

5. The vehicle according to claim 4, wherein an oil mist is provided in the electric machine, which serves to improve heat dissipation from exciter coils of a stator of the electric machine and the permanent magnets of the rotor.

6. The vehicle according to claim 4, wherein the electric machine further comprises an inner stator with exciter coils, wherein the inner stator with the exciter coils, on a side facing towards the rotor, is not, or is only partially, covered with a casting compound, wherein an uncovered part of the inner stator and/or an uncovered part of the exciter coils is/are in contact with an oil mist.

7. The vehicle according to claim 4, wherein, in order to reduce iron losses in the rotor, the rotor comprises a laminated construction or comprises a stamped laminated core inserted in the rotor.

8. The vehicle according to claim 1, wherein the electric machine comprises a laminated inner stator with exciter coils, a rotor and a metallic intermediate section, wherein the exciter coils of the inner stator are arranged across their radial longitudinal extension with an axial clearance, which is less than 2 mm from the intermediate section, and wherein the inner stator with the exciter coils and the intermediate section are filled with a filler with a heat conductance greater than that of air, wherein the intermediate section is connected to a housing of the electric machine by means of a screwed connection.

9. The vehicle according to claim 8, wherein the intermediate section is designed so that the exciter coils have the axial clearance from the intermediate section, such that a thermal resistance for generators with stator diameters of <200 mm (performance level for 500 W to 3000 W) is less than 2 k/W.

10. The vehicle according to claim 8, wherein the intermediate section or an area of the intermediate section is inset in the axial direction between the housing and the stator and rests against both, with axially aligned surfaces, such that a thermal resistance between the stator and the housing is as small as possible, and wherein the intermediate section is made from aluminium.

11. The vehicle according to claim 8, wherein the filler has a high specific conductance, and contains boron nitride and/or is formed from a thermoplastic or thermosetting plastic.

12. An assembly comprising: an inner stator with exciter coils and intermediate section in the vehicle according to claim 1, further including a filler comprising a thermoplastic, a cast material or a thermosetting plastic, wherein a space between the exciter coils and an intermediate section is filled using an injection moulding, vacuum casting or thermosetting manufacturing method, and the inner stator thereby has a positive connection with the intermediate section.

13. The vehicle according to claim 1, wherein the uncoupling mechanism comprises an overrunning clutch.

* * * * *